(12) United States Patent
Zheng et al.

(10) Patent No.: US 11,231,818 B1
(45) Date of Patent: Jan. 25, 2022

(54) CAPACITANCE AND CONDUCTIVITY DUAL SENSING STYLUS-INDEPENDENT MULTITOUCH FILM

(71) Applicant: Pathway Innovations and Technologies, Inc., San Diego, CA (US)

(72) Inventors: Xuezhe Zheng, San Diego, CA (US); Ji Shen, San Diego, CA (US)

(73) Assignee: Pathway Innovations and Technologies, Inc., San Diego, CA (US)

( * ) Notice: Subject to any disclaimer, the term of this patent is extended or adjusted under 35 U.S.C. 154(b) by 0 days.

(21) Appl. No.: 15/968,726

(22) Filed: May 1, 2018

Related U.S. Application Data

(60) Provisional application No. 62/492,867, filed on May 1, 2017.

(51) Int. Cl.
*G06F 3/044* (2006.01)
*G06F 3/045* (2006.01)

(52) U.S. Cl.
CPC .............. *G06F 3/044* (2013.01); *G06F 3/045* (2013.01); *G06F 2203/04102* (2013.01); *G06F 2203/04104* (2013.01); *G06F 2203/04106* (2013.01); *G06F 2203/04107* (2013.01)

(58) Field of Classification Search
CPC ........... G06F 3/044; G06F 2203/04103; G06F 2203/04111; G06F 2203/04112; G06F 3/045; G06F 30/30; G06F 30/392; G06F 3/03545; G06F 3/0446; G06F 3/0445; G06F 2203/04104; G06F 2203/04106; G06F 3/04146
See application file for complete search history.

(56) References Cited

U.S. PATENT DOCUMENTS

| | | | |
|---|---|---|---|
| 8,120,371 B2 | 2/2012 | Day et al. | |
| 9,001,082 B1 | 4/2015 | Rosenberg et al. | |
| 9,081,440 B2 | 7/2015 | Chang | |
| 9,639,179 B2 | 5/2017 | Armstrong-Muntner | |
| 2006/0232559 A1* | 10/2006 | Chien | G06F 3/044 345/168 |
| 2008/0007534 A1* | 1/2008 | Peng | G06F 3/044 345/173 |

(Continued)

*Primary Examiner* — Gerald Johnson
(74) *Attorney, Agent, or Firm* — Insigne PC

(57) ABSTRACT

Various embodiments of the present disclosure provide a system, device, apparatus, and method for detecting and registering contact made with a surface, by both conductive and non-conductive implements. The present disclosure comprises a first conductive layer comprising a plurality of first conductors, a second conductive layer comprising a plurality of second conductors and a plurality of third conductors, orientated substantially coplanar to the first conductive layer; and a dielectric layer disposed between the first conductive layer and the second conductive layer, the dielectric layer comprising a plurality of vias; each of the plurality of first conductors are arranged in a first pattern, each of the plurality of second conductors are arranged in a second pattern, the second pattern correlating to the space between each of the plurality of first conductors, and each of the plurality of the third conductors are substantially shaped and orientated in the first pattern.

20 Claims, 2 Drawing Sheets

(56) References Cited

U.S. PATENT DOCUMENTS

| | | | |
|---|---|---|---|
| 2009/0211891 A1* | 8/2009 | Lai | G06F 3/0416 |
| | | | 200/512 |
| 2013/0293482 A1* | 11/2013 | Burns | B81B 7/0006 |
| | | | 345/173 |
| 2016/0188082 A1* | 6/2016 | Ham | G06F 3/0412 |
| | | | 345/174 |
| 2016/0231849 A1* | 8/2016 | Watazu | G06F 3/044 |
| 2016/0291754 A1* | 10/2016 | Jin | G09G 3/00 |
| 2017/0153767 A1* | 6/2017 | Citta | G06F 3/0416 |
| 2017/0205912 A1* | 7/2017 | Li | G06F 3/0412 |
| 2018/0004320 A1* | 1/2018 | Polishchuk | G06F 3/044 |

* cited by examiner

CAPACITANCE AND CONDUCTIVITY DUAL SENSING STYLUS-INDEPENDENT MULTITOUCH FILM

CROSS-REFERENCE TO RELATED APPLICATIONS

The present application claims priority to U.S. Provisional Patent Application No. 62/492,867, filed on May 1, 2017 entitled, "Capacitance and Conductivity Dual Sensing Stylus-independent Multitouch Film," the disclosure of which is herein incorporated by reference in its entirety.

BACKGROUND OF THE INVENTION

1. Field of Invention

The present disclosure relates to stylus-independent multitouch film apparatuses and, specifically, a scalable touch screen with dual-sense matrix sensor using both capacitive and resistive matrix sensing.

2. Description of Related Art

Touch screen technologies have transformed the way humans interact with electronic devices, including handheld devices, multimedia displays, as well as medical, automotive, and various other industrial apparatuses. Especially engaging is the fluid touch screen interface that allow users to access an array of applications or scroll through web pages and libraries with their fingertips. Various touch screen technologies have been developed and deployed commercially using resistive, capacitive, surface acoustic wave and infrared sensing techniques.

Resistive sensing is one of the predominate touch screen technologies and is employed in wide range of applications such as smartphones, camcorders, PCs, automotive navigation devices, factory automation, medical equipment, office automation, kiosks, inflight entertainment systems, and so on. A resistive touch screen typically consists of top and bottom transparent sheets facing each other, having a gap disposed therebetween. The top and bottom sheets are coated with Indium Tin Oxide ("ITO"), a transparent conducting material. The top and bottom sheets have a uniform resistance value over its surface. As the top sheet is depressed, the pressed point of the top sheet physically yields and contacts the bottom sheet.

As the ITO layers of the top and bottom sheets contact, electricity is conducted at the contacted point between the two sheets, and the location of the conducted point is detected. PET film, glass, or polycarbonate plastic is most commonly used as the base material for the top and bottom sheets. The most basic combination utilized is a PET film top sheet and a glass surface as a bottom sheet (film/glass structure). However, other combinations such as glass/glass and film/film are also employed depending on applications. Each combination has its own idiosyncratic distinctive features. In some applications, spacer dots are printed on the bottom sheets to prevent the top and bottom sheets from contacting when not pressed, thereby mitigating false readings. Resistive technology is relatively low in cost due to the simple structure of the touch screen and controller circuit. Amongst different implementations, an analog resistive sensor has high resolution and location accuracy, but it doesn't support multi-touch points, i.e., reading two or more contact points simultaneously. In addition, large size analog resistive sensors (greater than 30 inches) are difficult to build because making a uniform ITO coating in such large size is extremely difficult. Resistive digital matrix technologies can be used to support multi-touch touch screens. However, as it can only detect touched points on the intersections of the ITO coatings, it has limited resolution and cannot support writing/drawing input.

Capacitive sensing is another important touch screen technology that is highly accepted in market. There are two types in capacitive technology: surface capacitive and projected capacitive. Similar to analog resistive sensing, surface capacitive sensors do not support multi-touch, hence their application is very limited. Projected capacitive sensor, on the other hand, supports multi-touch in a way similar to a resistive digital matrix. Due to its advantage in durability, life span, optical transparency, and response to light touch, projective capacitive is the most widespread touch screen technology implemented.

Projective capacitive touch technology is currently available in the art. Typically, this comprises a two-sheet-laminated structure, wherein the X- and Y-electrodes are formed on two respective sheets of glass. The two sheets of glass are laminated in a way that the two respective electrodes are facing one-another. The X- and Y-electrodes interest in a matrix. Because the human body is conductive, a capacitance coupling occurs between a person's finger and the electrodes when the finger is placed close to the electrodes. The finger's capacitance coupling makes the electrostatic capacitance between the electrodes change. As a result, the touch sensor detects the touched points as it checks where, on the electrode lines, the precise locational information can be obtained. However, this technology, achieve high resolution, requires vast amounts of fabrication resources and extremely tight tolerances. Additionally, since it requires a a conductive objected, such as a finger, this technology cannot work with typical writing and drawing implements such as pens and pencils.

Also available in the art is surface acoustic wave ("SAW") sensing technology. SAW relies on ultrasonic waves from the transmitting transducers traveling over the panel's surface, reflected by reflectors and received by the receiving transducers at the edge of the display. This technology is also limited because only objects that absorb acoustic waves can be used to register on the display.

Also available in the art is infrared ("IR") sensing technology. IR touch screens rely on light emitting elements and light receiving elements located at the edges of a display. The light emitting elements generally consist of LEDs while receiving elements are typically embodied by photo detectors. IR light rays pass over the surface of the panel in the X and Y directions. The photo detectors located on the opposite end of the LEDs receive the IR light. If the IR light is blocked by a touch object, the light will not reach the opposite photo detector, thereby registering the touch. This technology has its drawbacks as it suffers from low resolution. Additionally, the light may be blocked by anything, including dust and dirt, thereby making the system prone to false touches registering.

Therefore, what is needed is touch panel that can activated with minimal touch pressure and can further be triggered by commonly found writing implements such as pens and pencils. This need has heretofore remained unsatisfied.

SUMMARY OF THE INVENTION

The present disclosure overcomes these and other deficiencies of the prior art by providing a multi-touch apparatus comprising having a first conductive layer comprising a plurality of first conductors; a second conductive layer comprising a plurality of second conductors and a plurality of third conductors, the second conductive layer orientated substantially coplanar to the first conductive layer; and a dielectric layer disposed between the first conductive layer and the second conductive layer, the dielectric layer comprising a plurality of vias. In some embodiments, each of the plurality of first conductors are arranged in a first pattern. In other embodiments, each of the plurality of second conductors are arranged in a second pattern, the second pattern correlating to the space between each of the plurality of first conductors. In other embodiments, each of the plurality of the third conductors are substantially shaped and orientated in the first pattern.

In another exemplary embodiment of the present disclosure, a touch screen device comprises a capacitive sensor layer comprising an X-electrode conductive layer, a Y-electrode conductive layer, and a dielectric layer disposed between the X-electrode layer and the Y-electrode layer, wherein the dielectric layer comprises a plurality of vias. In some embodiments, a conductive film is placed adjacent to the Y-electrode conductive layer.

In other embodiments, the touch screen device further comprises a plurality of isolation dots disposed between the Y-electrode conductive layer and the conducting film.

In other embodiments, the touch screen device further comprises a protection film disposed on the X-electrode conductive layer on a side opposite the dielectric layer.

In other embodiments, the protection film is flexible.

In other embodiments, the touch screen device may further comprise a capacitance measurement circuit.

In other embodiments, the touch screen device may further comprise a resistance measurement circuit.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present disclosure, the objects and advantages thereof, reference is now made to the ensuing descriptions taken in connection with the accompanying drawings briefly described as follows.

DETAILED DESCRIPTION OF EMBODIMENTS

Further features and advantages of the disclosure, as well as the structure and operation of various embodiments of the disclosure, are described in detail below with reference to the accompanying FIGS. 1A-C. Although the disclosure is described in the context of a surface, the present disclosure relates to any type of multi-touch surface, device, or apparatus.

Figure 1A:
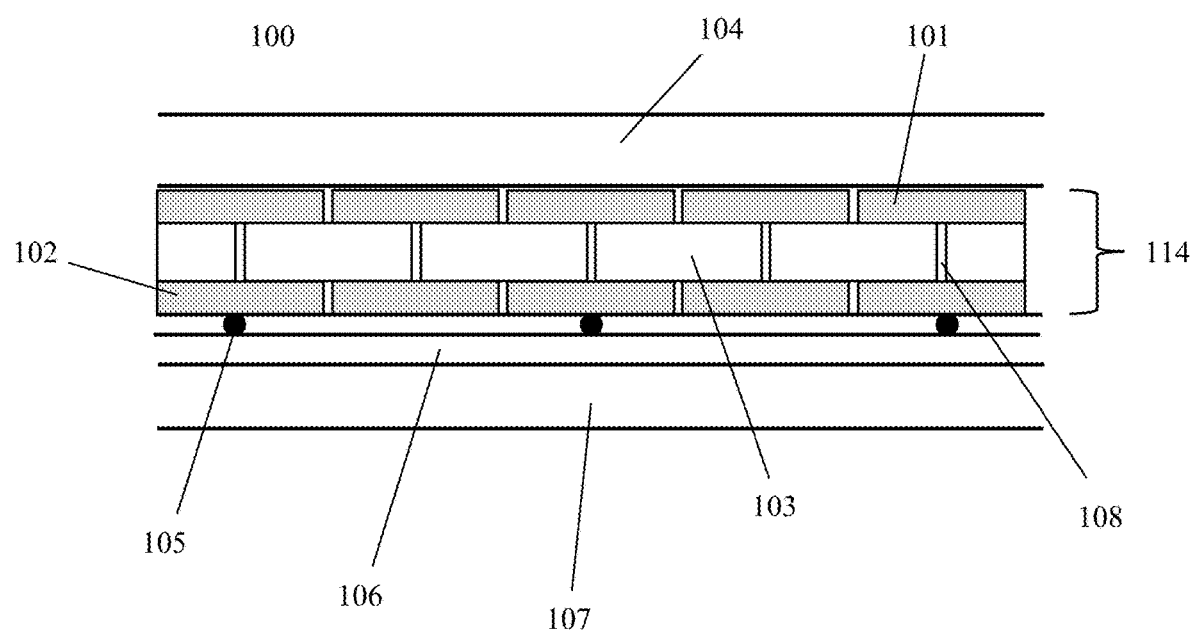
FIG. 1A illustrates a cross sectional side view of a multi-touch surface, according to an exemplary embodiment of the present disclosure.

In an exemplary embodiment of the present disclosure and with reference to FIG. 1A, a multi-touch surface 100 comprises an X-electrode conductive layer 101 (X-layer) and a Y-electrode conductive layer 102 (Y-layer). Disposed between the X-layer 101 and the Y-layer 102 is a dielectric layer 103. The dielectric layer 103 may comprise a plurality of vertical interconnected accesses ("vias") 108. Vias are known in the art and serve as an electric connection between layers in a physical electronic circuit that goes through the plane of one or more adjacent layers. Use of vias is readily apparent to one skilled in the art. The combination of the X-layer 101, the Y-layer 102 and the dielectric layer 103 form a capacitive sensor layer 114. The capacitive layer 114 may comprise a plurality of vias 108.

The surface 100 may further comprise a conducting film 106 adjacent to the P-layer 102. Some embodiments may include a plurality of isolation dots 105 disposed between the Y-layer and the conducting film 106. The dots 105 may be non-conductive and serve to isolate the Y-layer and the conducting film 106. Although only three dots 105 are shown, any number of dots 105, having a variety of shapes and sizes may be used without departing from the embodiments contemplated. The X-layer 101 may have a protection film 104 disposed thereon, on a side opposite the dielectric layer 103. The protection film 104 may be flexible. In some embodiments, film 104 may be constructed from PET, thin glass, or polycarbonate, or a combination thereof. Additionally, a glass layer 107 may be attached to the conductive layer 106. In some embodiments, a display screen (not shown) may be placed below the glass layer 107. In such embodiments, transparent electrodes, vias, and conductive films may be used, including ITOs.

When using a conductive object, such as a conductive stylus, the conductive layer 106 may not contact the capacitive layer 114. This may occur when a user applies minimal pressure to the writing instrument. In such an embodiment, the touch will still be registered because the capacitive layer 114 will still register the touch as the capacitance measurement circuits (not shown) may still access the X-electrodes 101 and Y-electrodes 102 sequentially, the capacitance of the pixels corresponding to X- and Y-electrode lines can still be measured, thereby detecting the touch.

When a non-conductive stylus touches the screen with sufficient force, the capacitive layer 114 will contact the conductive layer 106. The corresponding X-electrode and Y-electrode will be shorted and, consequentially, zero capacitance will be measured. When a zero capacitance is detected, the resistance between the corresponding X and Y electrodes will be measured. The measured resistance value is usually inversely proportional to the force applied to the non-conductive stylus. As a result, two measurements are obtained: an array of capacitance corresponding to the X/Y electrode matrix and the resistance values for the X/Y electrode pair with zero capacitance. The touch point(s) can then be determined by the local maximum capacitance or minimum resistance point(s). Further, the two measurements may be fused to achieve higher resolution.

Figure 1B:
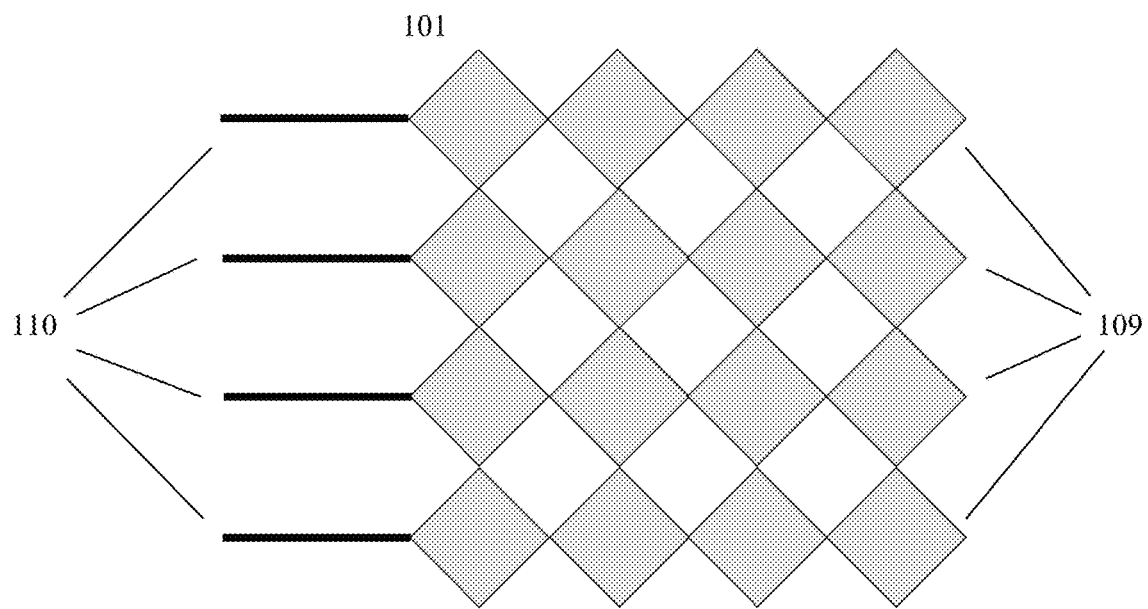
FIG. 1B illustrates a top view of a first conductive layer, according to exemplary embodiments of the present disclosure.

In another exemplary embodiment of the present disclosure and with reference to FIG. 1B, the X-layer 101 comprises a plurality of X-electrodes 109 arranged in a horizontal pattern. X-connectors 110 transmit the electrical signal from the electrodes 109 to a receiving unit for processing (not shown). Although X-electrodes 109 are shown as having a diamond shape, any shape may be used to facilitate the embodiments contemplated herein. Further, although X-lay 101 is shown as a four by four (4×4) matrix, any size matrix may be used, including those forming a pattern other than a square, e.g., a rectangle, may be used without departing from the embodiments contemplated.

Figure 1C:
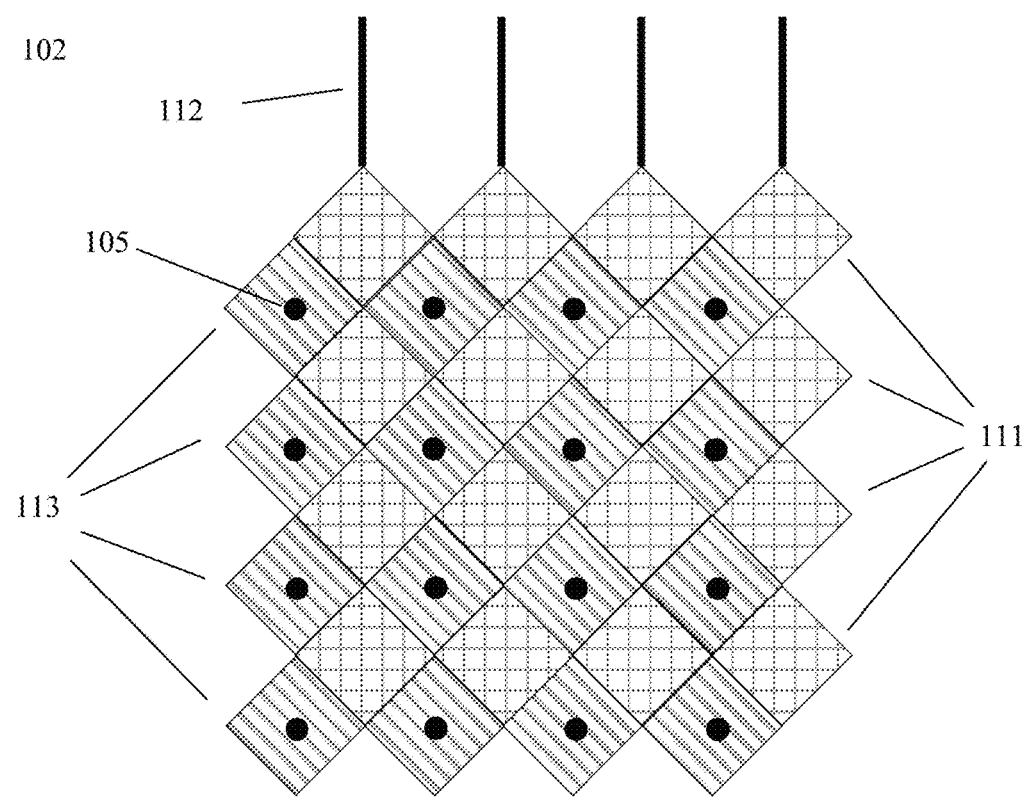
FIG. 1C illustrates a top view of a second conductive layer, according to exemplary embodiments of the present disclosure.

In another exemplary embodiment of the present disclosure and with reference to FIG. 1C, the Y-layer 102 comprises a plurality of Y-electrodes 111 arranged in a vertical pattern. Y-connectors 112 transmit the electrical signal from the electrodes 111 to a receiving unit for processing (not shown). In some embodiments, a plurality of conductive pads 113 may be disposed in the areas not occupied by the Y-electrodes 111. The conductive pads 113 may not be connected to any Y-electrodes 111. In such an embodiment, the conductive pads 113 may be disposed correspondingly adjacent to and connected to the X-electrodes 109 through the plurality of vias 108. In such a configuration, when viewed from above, the Y-layer 101 and the X-layer 102 for a matrix. The conductive pads 113 may have a plurality of isolation dots 105 disposed thereon. Although isolation dots 105 are shown as being evenly distributed on the substantial center of the conductive pads 113, any number of isolation dots 105 may be used on a particular conductive pad 113, including zero, and not arranged in the substantial center, without departing from the embodiments contemplated. Further, the dots 105 may be placed on the Y-electrodes instead of, and/or in combination with, the conductive pads 113. Additionally, although the conductive pads 113 are shown as being incorporated into the same layer as the Y-electrodes 111, the conductive pads 113 may be implemented into the X-layer 101 instead of, and/or in addition to, Y-layer 102, without departing from the embodiments contemplated.

Although a multi-touch surface has been shown and described, multi-touch surfaces may be implemented according to other embodiments of the disclosure. For example, multi-touch surfaces may be implemented using thin film transistors ("TFT"). TFTs are used in LCD displays. In such an embodiment, a 2-D array of TFTs and metal capacitors are first fabricated on the back of the protection top sheet in the form a Manhattan Grid, as the Y-electrodes layer of a capacitive sensor matrix. Each cell of the 2-D array comprises a TFT with its "Source" electrode connected to one pad of a metal capacitor (Anode, occupying approximately half of the cell space). The "Drain" electrodes of the TFTs in the same column are connected to one Y-electrode of the touch matrix for that column. The other pad of a metal capacitor (Cathode) is placed next to the Anode, occupying the other half of the cell space. The Y-electrode layer is then covered by a thin dielectric layer for isolation. A conductive X-electrode layer is deposited and patterned with two metal pads identical to the two pads on the Y-electrode layer. In each row an X-electrode line connects to all the "Gate" electrode of the TFTs in the row using vias. Both pads on X-electrode layer are connected to the corresponding pads on the Y-electrode layer through vias. All the "Cathode" pads in a row are connected together and all the "cathode" lines are grounded.

The capacitive sensor film is then attached to a substrate with patterned metal pads. To separate the capacitive sensor film and the conducting film without touch, non-conductive dots on the conductive film are used for isolation. Isolation dot with proper size and density shall be used to control the touch force needed for the resistive touch sensing to work.

In operation, the circuits access the X-electrode to open the "Gate" of the TFTs in a row. And then the capacitance (or resistance) measurement circuits access one Y-electrode to measure the capacitance of one cell with coordinates corresponding to the X- and Y-electrodes. Scanning through the X- and Y-electrodes, all the cells within the array can be measured sequentially.

When a conductive stylus touches the screen in light touch mode, the capacitive sensor layer will not touch the bottom conducting layer while the capacitance between the corresponding X-electrode and Y-electrode to the object touch, resulting in the detection of the touch. When a non-conductive stylus touches the screen with appropriate force, the capacitive sensor layer will be in contact with the bottom conductive layer where touched. The corresponding X-electrode and Y electrode will be shorted consequently, resulting in a zero capacitance when measured. When a zero capacitance is measured, the resistance between the corresponding X and Y electrode shall be measured. Using the display TFT technology, the sensor array can be made with very high resolution, in which case the measured capacitance (or resistance) value can be simplified to two states, "On" and "Off" representing touch or no-touch. As discussed, with the dual-sense matrix, two sets of data can be obtained, an array of capacitance corresponding to the X/Y electrode matrix, and resistance values for X/Y electrode pair with zero capacitance. The touch point(s) can be determined directly from the measured capacitive and/or resistive states accurately. Sub-millimeter touch sensing resolution can be achieved.

In the designs described, the capacitive sensor matrix on the bottom side of the top flexible sheet can be built on the top surface of the bottom hard substrate, i.e., glass, with the same process steps, while the conducting metal pad layer on the top surface of the bottom substrate is moved to the bottom surface of the top flexible sheet. In order for the capacitive sensing to work such configuration, however, the conducting metal layer needs to be patterned into array of metal strips each only overlaps partially with the two capacitor pads underneath such that when the flexible top sheet is touched by a conductive object, the capacitance of the pixel(s) touched will be changed. When the top sheet is pressed further, its bottom metal strips will be in contact with and short the capacitor pads underneath, triggering a resistive touch sensing. In all embodiments, touch pressure can be measured based on the measured resistance change.

In an embodiment of the disclosure, the methodologies and techniques described herein are implemented on a surface having a special purpose computer connected thereto and configured to receive signals and interpret those signals into registering touch(es). In an embodiment of the disclosure, the special-purpose computer comprises an embedded system with a dedicated processor equipped. Additionally, the embodiments contemplated herein may be used in conjunction with an independent computer configured to receive, interpret, register, and/or output touch(es) detected on the multi-touch surface. The disclosure has been described herein using specific embodiments for the purposes of illustration only. It will be readily apparent to one of ordinary skill in the art, however, that the principles of the disclosure can be embodied in other ways. Therefore, the disclosure should not be regarded as being limited in scope to the specific embodiments disclosed herein, but instead as being fully commensurate in scope with the following claims.

We claim:

1. A multi-touch apparatus comprising:
   a first conductive layer comprising a plurality of first conductors;
   a second conductive layer comprising a plurality of second conductors and a plurality of third conductors, the second conductive layer orientated substantially coplanar to the first conductive layer; and
   a dielectric layer disposed between the first conductive layer and the second conductive layer, the dielectric layer comprising a plurality of vias;

wherein each of the plurality of first conductors are arranged in a first pattern;

wherein each of the plurality of second conductors are arranged in a second pattern, the second pattern correlating to the space between each of the plurality of first conductors, the plurality of second conductors are connected to the plurality of first conductors through the plurality of vias in the dielectric layer; and wherein each of the plurality of the third conductors are substantially shaped and orientated in the first pattern.

2. The apparatus of claim 1, further comprising a protection film disposed on the first conductive layer on a side opposite the dielectric layer.

3. The apparatus of claim 2, wherein the protection film is flexible.

4. The apparatus of claim 1, further comprising a conductive film adjacent to the second conductive layer.

5. The apparatus of claim 4, further comprising a plurality of isolation dots disposed between the second conductive layer and the conducting film.

6. The apparatus of claim 4, further comprising a glass layer adjacent to the conductive film.

7. A multi-touch screen device comprising:
a capacitive sensor layer comprising:
a first conductive layer;
a second conductive layer; and
a dielectric layer disposed between the first conductive layer and the second conductive layer, wherein the dielectric layer comprises a plurality of vias;
a conductive film adjacent to the second conductive layer;
a capacitance measurement circuit; and
a resistance measurement circuit;
wherein the first conductive layer comprises a plurality of first conductors;
wherein the second conductive layer comprises a plurality of second conductors and a plurality of third conductors;
wherein each of the plurality of first conductors are arranged in a first pattern;
wherein each of the plurality of second conductors are arranged in a second pattern, the second pattern correlating to the space between each of the plurality of first conductors, the plurality of second conductors are connected to the plurality of first conductors through the plurality of vias in the dielectric layer;
wherein each of the plurality of the third conductors are substantially shaped and orientated in the first pattern;
wherein the first conductive layer further comprises a plurality of X-electrodes;
wherein the second conductive layer further comprises a plurality of Y-electrodes;
wherein the plurality of X-electrodes and the plurality of Y-electrodes correspond to an X/Y electrode matrix;
wherein the capacitance measurement circuit measures an array of capacitances corresponding to the X/Y electrode matrix; and
wherein a touch point is determined based on a maximum capacitance point of the array of capacitances and further based on a minimum resistance point measured by the resistance measurement circuit.

8. The device of claim 7, further comprising a plurality of isolation dots disposed between the second conductive layer and the conducting film.

9. The device of claim 8, further comprising a protection film disposed on the first conductive layer on a side opposite the dielectric layer.

10. The device of claim 9, wherein the protection film is flexible.

11. The device of claim 7, further comprising a resistance measurement circuit.

12. The device of claim 7, further comprising a glass layer adjacent to the conductive film.

13. The device of claim 12, further comprising a display screen below the glass layer.

14. The device of claim 7:
wherein the capacitive sensor layer further comprises transparent electrodes;
wherein the plurality of vias are transparent; and
wherein the conductive film is transparent.

15. The device of claim 7, further comprising a conductive object,
wherein less than a threshold pressure applied by the conductive object does not cause the conductive film to contact the capacitive sensor layer, and
further wherein the pressure is registered as a first touch by the capacitance measurement circuit.

16. The device of claim 15, wherein the capacitance measurement circuit registers the pressure as the first touch by measuring a capacitance of at least one pixel corresponding to at least one X-electrode of the first conductive layer and further corresponding to at least one Y-electrode of the second conductive layer.

17. The device of claim 15, further comprising a non-conductive object,
wherein greater than the threshold pressure applied by the non-conductive object causes the conductive film to contact the capacitive sensor layer, and
further wherein the pressure is registered as a second touch.

18. The device of claim 17, further comprising a resistance measurement circuit,
wherein the first conductive layer comprises a plurality of X-electrodes,
wherein the second conductive layer comprises a plurality of Y-electrodes,
wherein the plurality of X-electrodes and the plurality of Y-electrodes correspond to an X/Y electrode matrix,
wherein the capacitance measurement circuit measures an array of capacitances corresponding to the X/Y electrode matrix,
wherein a minimum resistance point corresponds to an X/Y electrode pair of the array of capacitances having zero capacitance, and
wherein the pressure is registered as the second touch in response to measuring the minimum resistance point.

19. The device of claim 18 wherein a touch point is determined based on a maximum capacitance point of the array of capacitances or based on the minimum resistance point measured by the resistance measurement circuit.

20. The device of claim 15 wherein the conductive object is a stylus.

* * * * *